UNITED STATES PATENT OFFICE.

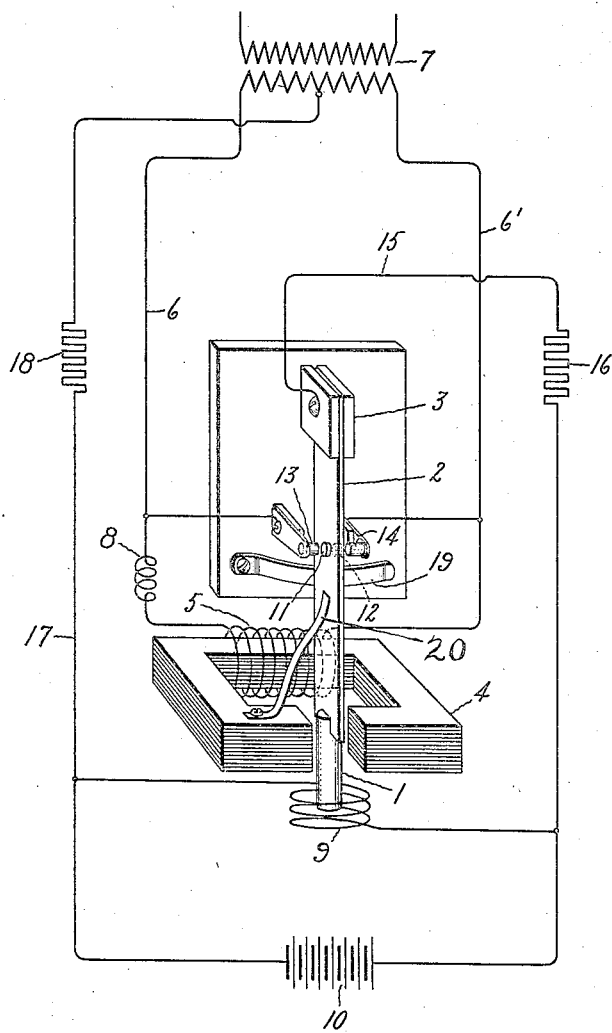

JOHN THOS. DEMPSTER, OF SCHENECTADY, NEW YORK, ASSIGNOR TO GENERAL ELECTRIC COMPANY, A CORPORATION OF NEW YORK.

VIBRATING RECTIFIER.

1,159,189.  Specification of Letters Patent.  Patented Nov. 2, 1915.

Application filed June 3, 1912. Serial No. 701,114.

*To all whom it may concern:*

Be it known that I, JOHN T. DEMPSTER, a subject of the King of Great Britain, residing at Schenectady, county of Schenectady, State of New York, have invented new and useful Improvements in Vibrating Rectifiers, of which the following is a specification.

The present invention relates to mechanical vibrating devices for rectifying alternating currents, such as described, for example in my prior Patent No. 1,019,608 of March 5, 1912.

My present invention comprises certain structural improvements as pointed out with particularity in the claims, which are directed especially to the prevention of a reversal of the rectifier, as when charging a battery, and its alternating current supply fails temporarily.

The accompanying drawing illustrates one embodiment of my invention. It shows a somewhat diagrammatic view of the vibrating rectifier and a diagram of connections therefor.

Referring to this figure, it will be seen the rectifier is provided with a vibrating reed comprising an armature 1 mounted on a flexible support 2 which is attached to a fixed base 3, as indicated. The armature 1 vibrates between the oppositely disposed poles of an alternating current magnet 4, having a nearly closed magnetic circuit. The winding 5 of this magnet is connected by conductors 6, 6' to a source of alternating current such as the secondary of a transformer 7. In series therewith is a reactance 8. This reactance produces a phase displacement between the current in the magnet circuit and the current to be rectified, so as to compensate for the inertia of the moving parts and cause the make and break to be made near the zero point of the alternating current. The armature 1 is magnetized in the direction of its length by a coil 9 which is connected to a source of direct current. This conveniently may be the storage battery 10, which is being charged as hereinafter described by the rectifier. The vibrating reed is preferably proportioned so that its natural period of vibration will be approximately the same as that of the frequency of the alternating current source. The reed carries contacts 11, 12, which engage respectively with fixed contacts 13, 14, preferably mounted on flexible supports. These fixed contacts are connected to conductors 6, 6' respectively and thus to the source of alternating current. The vibrator itself is connected by a conductor 15 to one pole of the storage battery 10 and has preferably included in its circuit a resistance 16. The other pole of the battery is connected to the neutral point of the secondary of the transformer 7 by conductor 17 which also contains a series resistance 18. These series resistances exert a steadying effect upon the battery.

It will be observed that as the armature 1 oscillates in the air gap of the alternating magnet in synchronism with the alternations of magnetism of the magnet 4 it will touch alternately contacts 13, 14 and will deliver impulses of current to the battery 10.

Unless some provision is made, the vibrations of the armature 1 would continue in case the alternating current supply were interrupted for any reason, as the vibrator then would deliver impulses of current alternately to conductors 6 and 6' from the battery 10 and these impulses would energize the alternating current magnet winding 5. This process would continue until the battery charge were exhausted. I have found that this reversal of the rectifier may be effectually prevented by providing a damping device, preferably consisting of a small flexible band spring 19 which frictionally engages with the vibrator. When the apparatus is normally operating with a normal current supply, the pull of the magnet 4 is sufficient to overcome the damping effect exerted by the spring 19 so that it does not interfere with the vibrations of the armature. When however, the alternating current supply is temporarily interrupted the friction exerted by the spring is great enough to arrest the vibrations caused by the comparatively feeble excitation of the magnet 4 by the battery discharge.

I have also found that sometimes difficulty is experienced in starting the vibrator from a state of rest. When the armature 1 is situated in a central position in the air gap of the magnet 4, apparently the magnetic pull of the poles of the magnet is not sufficient to start the vibrations. To avoid this difficulty I may provide a thin flexible strip 20 which bears against the support 2 in such a manner that in case the alternating current supply is interrupted the vibrator will come to a position of rest near one pole of the magnet 4. In this position it is readily started when the alternating current is reëstablished. In some cases, this spring alone exerts a sufficient braking action to prevent the discharge of the battery when the alternating current supply of the battery fails, and the spring 19 may be omitted.

It will be understood, of course, that my invention is not limited to the particular form of rectifier herein described.

What I claim as new and desire to secure by Letters Patent of the United States, is:—

1. In a vibrating rectifier, the combination of a magnet energized by alternating current, an armature free to vibrate in step with the magnetic pulsations of said magnet, a resilient support for said armature, coöperating switching contacts actuated by the vibrations of said member for delivering unidirectional impulses, and damping means for bringing the armature to a position in which said switching contacts will be separated when the alternating current supply fails.

2. In a vibrating rectifier, means for generating a pulsating magnetic flux, a freely vibrating member actuated by said magnetic means, a resilient strip frictionally engaging said vibrating member and coöperating switching contacts for delivering alternating impulses of current as unidirectional impulses.

3. In a vibrating rectifier, the combination of a magnet having a substantially closed magnetic circuit and having oppositely disposed poles with an intervening air gap, an armature free to vibrate in said gap, coöperating contacts actuated thereby, and a spring engaging with said armature to hold the same when at rest out of a central position in the gap, whereby it is placed in a position favorable to start when the magnet is energized with alternating current.

4. A vibrating rectifier comprising a magnet energized by alternating current, a contact-carrying vibrator oscillating in the field of said magnet, contacts coöperating with the vibrator contacts, and means for arresting the oscillations of the vibrator when the supply of alternating current fails in order to prevent a reverse discharge of rectified current through the rectifier.

5. A rectifier adapted to be fed by alternating current and containing a member vibrating in step with said alternating current, contacts receiving unidirectional impulses of current, and frictional means for damping the vibrations of said member to prevent a reverse discharge through the rectifier when the alternating current supply fails.

In witness whereof, I have hereunto set my hand this 31st day of May 1912.

JOHN THOS. DEMPSTER.

Witnesses:
 BENJAMIN B. HULL,
 HELEN ORFORD.